US007222797B2

United States Patent
Dávila et al.

(10) Patent No.: US 7,222,797 B2
(45) Date of Patent: May 29, 2007

(54) MULTIMEDIA GIFT CARD

(76) Inventors: Milton Dávila, 320 Plaza Real #310, Boca Raton, FL (US) 33432; James Brian Sanders, 26 Woodland Dr., Amherst, NH (US) 03031; Charles Dembisky, 34 Woodland Dr., Amherst, NH (US) 03031

( * ) Notice: Subject to any disclaimer, the term of this patent is extended or adjusted under 35 U.S.C. 154(b) by 0 days.

(21) Appl. No.: 10/660,294

(22) Filed: Sep. 11, 2003

(65) Prior Publication Data

US 2004/0046035 A1    Mar. 11, 2004

Related U.S. Application Data

(63) Continuation of application No. 10/056,739, filed on Jan. 25, 2002, now Pat. No. 6,666,378.

(51) Int. Cl.
*G06K 19/00* (2006.01)

(52) U.S. Cl. ............... 235/487; 40/124.03; 40/124.06; 40/124.16; 40/789; 206/232; 206/485

(58) Field of Classification Search ............... 235/487; 369/272–274; 206/232, 38, 235, 308, 493, 206/312, 313, 308.1; 283/67, 117; 434/307
See application file for complete search history.

(56) References Cited

U.S. PATENT DOCUMENTS

| | | | | |
|---|---|---|---|---|
| RE30,666 E | * | 7/1981 | Mitchell et al. | ......... 434/307 R |
| 4,765,466 A | * | 8/1988 | Ivey | ............ 206/232 |
| 5,282,537 A | * | 2/1994 | Wong | ........... 206/485 |
| 5,387,108 A | * | 2/1995 | Crowell | ............ 434/319 |
| 5,595,008 A | * | 1/1997 | Johnson | ............ 40/124.06 |
| 5,629,977 A | * | 5/1997 | Fonseca | ............ 379/114.18 |
| 5,685,424 A | | 11/1997 | Rozek et al. | |
| 5,697,496 A | | 12/1997 | Bauer | |
| 5,761,836 A | * | 6/1998 | Dawson | ............ 40/124.03 |
| 5,775,491 A | | 7/1998 | Taniyama | |
| 5,915,734 A | | 6/1999 | Minehart | |
| 5,946,834 A | * | 9/1999 | Bradley | ............ 40/124.16 |
| 6,003,254 A | | 12/1999 | Lorber | |
| 6,035,280 A | | 3/2000 | Christensen | |
| 6,070,719 A | * | 6/2000 | Pollock | ............ 206/232 |
| 6,328,160 B1 | | 12/2001 | Cooksey | |
| 6,349,829 B1 | | 2/2002 | Matheis et al. | |
| 6,449,891 B1 | * | 9/2002 | Miska | ............ 40/789 |
| 6,453,300 B2 | | 9/2002 | Simpson | |

(Continued)

*Primary Examiner*—Michael G. Lee
*Assistant Examiner*—Allyson N Trail
(74) *Attorney, Agent, or Firm*—Patrick D. Archibald; Archibald IP LLC

(57) ABSTRACT

A promotional tool and a vehicle used to distribute products, information, gift certificates, prepaid phone cards, and coupons for businesses, corporations, retail establishments, universities, and sales personnel. A customized gift card displays professionally created artwork, logos and graphics that best portray the provider's intent for the overall design. The card is folded, die-cut and glued to receive a multimedia disc, gift certificate, coupon or phone card. A Multimedia Disc is included as a gift with each card. It is a digital medium that contains professionally recorded digital music and a variety of audio, video, and graphic information regarding the provider. It is placed in the card so the label which supports the card's overall design, is in view. A gift certificate, coupon, or a prepaid phone card can be placed in the card for easy accessibility and scanning by a retailer.

31 Claims, 6 Drawing Sheets

U.S. PATENT DOCUMENTS

| | | |
|---|---|---|
| 6,457,581 B1 | 10/2002 | Lesovoy |
| 6,491,160 B2 | 12/2002 | Butler et al. |
| 6,493,970 B1 | 12/2002 | McCarthy et al. |
| 6,505,737 B1 | 1/2003 | Sherman |
| 6,510,124 B1 | 1/2003 | Wood |
| 2001/0047843 A1* | 12/2001 | Reinig ......................... 156/63 |
| 2002/0088855 A1* | 7/2002 | Hodes ......................... 235/385 |
| 2002/0100797 A1* | 8/2002 | Hollingsworth et al. ... 229/92.8 |
| 2003/0028439 A1* | 2/2003 | Cox et al. ..................... 705/26 |
| 2003/0052021 A1* | 3/2003 | Mc Kenzie .............. 206/308.1 |

* cited by examiner

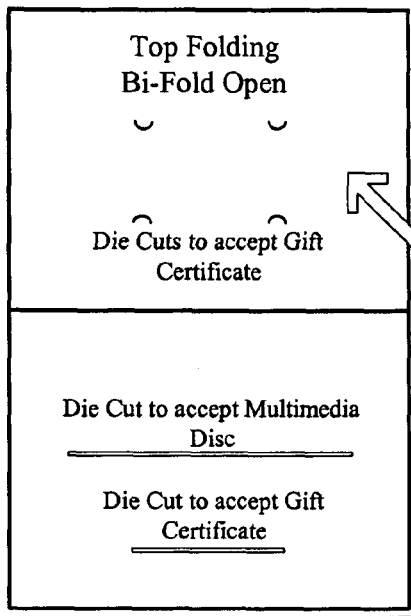
FIGURE 8
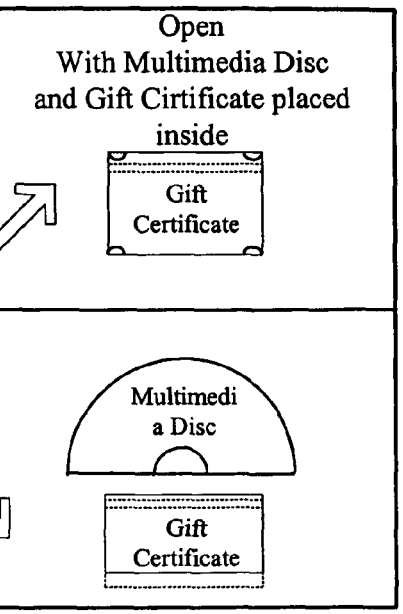
FIGURE 8a
Top Folding Bi-Fold Designs
Gift certificate is concealed when the gift card is closed. It can be placed in either position
Top Folding Bi-Fold Closed
FIGURE 8b
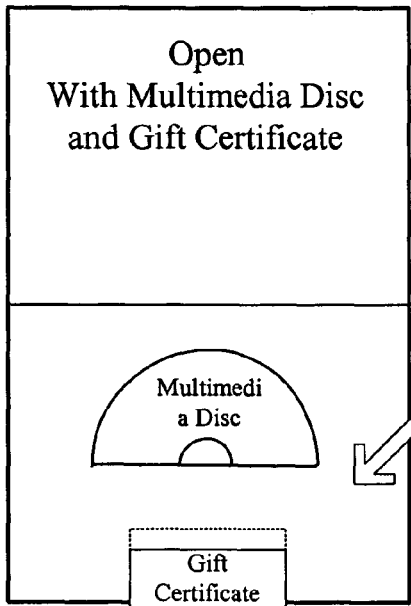
FIGURE 9
Gift certificate is positioned to allow easy access to magnetic strip or Bar Code which is placed on the back of the gift card.
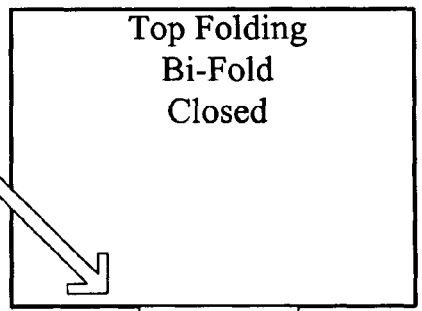
FIGURE 9a

Side Folding Bi-Fold Design
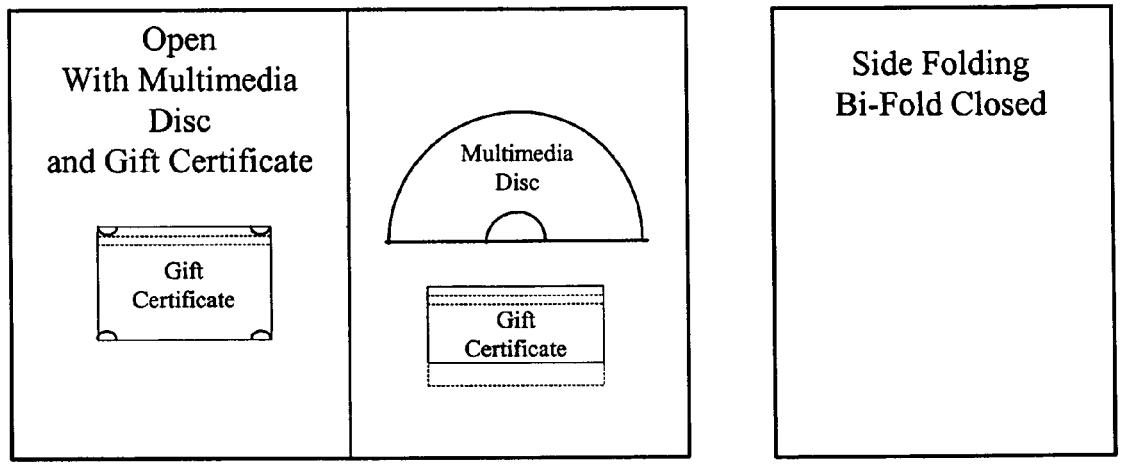
FIGURE 10
Gift certificate is conceiled when the gift card is closed
FIGURE 10a
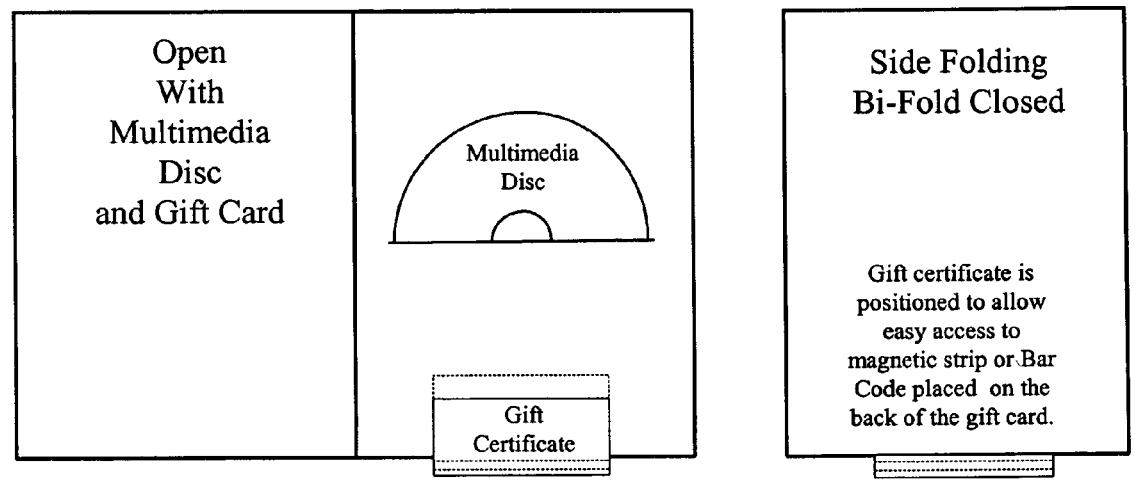
FIGURE 11
FIGURE 11a

Tri-Fold Design

Multi-Fold Design

Multi-Fold Closed
With Multimedia
Disc
and Gift Certificate

MULTIMEDIA GIFT CARD

CROSS-REFERENCE TO RELATED APPLICATIONS

This is a continuation of U.S. application Ser. No. 10/056,739, filed Jan. 25, 2002, now U.S. Pat. No. 6,666,378 now pending. Said application Ser. No. 10/056,739 is incorporated herein by reference in its entirety.

STATEMENT REGARDING FEDERALLY SPONSORED RESEARCH OF DEVELOPMENT

Not Applicable.

REFERENCE TO A "SEQUENCE LISTING," A TABLE, OR A COMPUTER PROGRAM LISTING APPENDIX SUBMITTED ON A COMPACT DISC.

Not Applicable.

BACKGROUND OF INVENTION (1) Field of Invention

The field of art for which the Multimedia Gift Card pertains to is gift card, multimedia/music compact disc, gift certificates and promotional material.

(2) Description of Prior Art

Music recorded on all types of medium has been sold and given as gifts for many years.

Seasonal and non-seasonal gift cards have also been a primary means to express sentiment and celebrate a multitude of events.

Corporations and businesses have often given small gifts to employees, sales staff and customers which include pens, cups, glasses, bumper stickers, hats, and shirts, usually displaying the company colors, logos, and information. All of these items, when given, are perceived as gifts to the receiver, however; also have immense promotional value for the provider.

Retailers often provide gift certificates for purchase that are usually in the form of a plastic credit card. These gift certificates are usually not packaged to be given as a gift. Most gift cards hang from a piece of cardboard on a display rack previously sold with a single piece of cardboard which sometimes could be folded into a simple card. Retailers relied on displaying individual gift certificates from a single piece of cardboard, paper or plastic. The purchaser in most cases would have to purchase an additional card to send or give the certificate, coupon or prepaid phone card as a gift.

The advent and mass production of the personal computer, reduction in system cost, and increased popularity and accessibility to the internet, has enabled most consumers to own or have access to a computer. The exponential growth and availability of digital quality audio, video and graphics accompanied by the many compression formats and increased storage capacity of digital medium has provided a unique and diverse avenue for promotion by corporations, business, brokers, retailers, and universities.

BRIEF SUMMARY OF THE INVENTION

The multimedia gift card consists of three major components. A customized gift card, a disc, or other form of digital medium will be used, but is not limited to, hold digital quality music and graphics, and a gift certificate or a prepaid phone card.

The gift card is uniquely designed and customized to represent the corporation, business, brokerage firms, retailers or universities for which the gift card is made. The multimedia disc is included as a gift that displays a label which supports or matches the cards overall theme or design. The multimedia disc contains, but is not limited to, professionally recorded digital music, computer generated multimedia presentations, video presentations, company information and printable coupons. Die-cuts are made in the card to receive the multimedia disc, prepaid phone card or gift certificate.

The multimedia gift card is designed for corporations to present a personalized gift to employees, sales personnel and business associates. This invention combines conventional marketing technology, computer generated graphics and digital audio and video to create a total gift package.

The multimedia gift card provides retailers a creative, unique and personal packaging for their gift certificates, prepaid phone cards and products. The outstanding digital music, which is included as a special gift, will provide many years of listening enjoyment while the disc label information provides a lasting reminder of the multimedia discs origin. This invention will create a memorable tie to the provider that will ultimately create a favorable and lasting emotional bond with the receiver. This invention combines marketing, promotion, and entertainment to create an invaluable promotional tool as well as a vehicle to distribute products and information.

BRIEF DESCRIPTION OF THE SEVERAL VIEWS OF THE DRAWINGS

The drawings include bi-fold, tri-fold and multi-fold Multimedia Gift Cards of various shapes, sizes, folds and design characteristics. Some cards exhibits die-cuts to receive a Multimedia Disc and gift certificate.

FIG. 8: Displays an example of a Top Folding Bi-Fold card design showing the die-cuts that can receive a Multimedia Disc and gift certificate. The gift certificate is concealed when the gift card is closed. The gift certificate can be placed in either position, at the bottom or top of the card, depending on the overall card design.

FIG. 8a: Displays an example of a Top Folding Bi-Fold card design that is open with a Multimedia Disc and Gift Certificate placed inside. The gift certificate is concealed when the gift card is closed. The gift certificate can be placed in either position, at the bottom or top of the card, depending of the overall card design.

FIG. 8b: Displays an example of a Top Folding Bi-Fold card design that is closed.

FIG. 9: Displays an example of a Top Folding Bi-Fold card design that is open with a Multimedia Disc and a gift certificate. The gift certificate is positioned to allow easy access to the magnetic strip or Bar Code that is placed on the back of the gift card. This will allow easy access for retail sale.

FIG. 9a: Displays an example of a Top Folding Bi-Fold card design that is closed. The gift certificate is positioned to allow easy access to the magnetic strip or bar code that is placed on the back of the gift card. This will allow easy access for retail sale.

FIG. 10: Displays an example of a Side Folding Bi-Fold card design that is open with a Multimedia Disc and a Gift Certificate. The gift certificate is concealed when the gift card is closed.

FIG. 10a: Displays an example of a Side Folding Bi-Fold card design that is closed. The gift certificate is concealed when the gift card is closed.

FIG. 11: Displays an example of a Side Folding Bi-Fold card design that is open with a Multimedia Disc and a gift certificate. The gift certificate is positioned to allow easy access to the magnetic strip or bar code that is placed on the back of the gift card.

FIG. 11a: Displays an example of a Side Folding Bi-Fold card design that is closed. The gift certificate is positioned to allow easy access to the magnetic strip or bar code that is placed on the back of the gift card. This will allow easy access for retail sale.

DETAILED DESCRIPTION OF THE INVENTION

Figure 1:
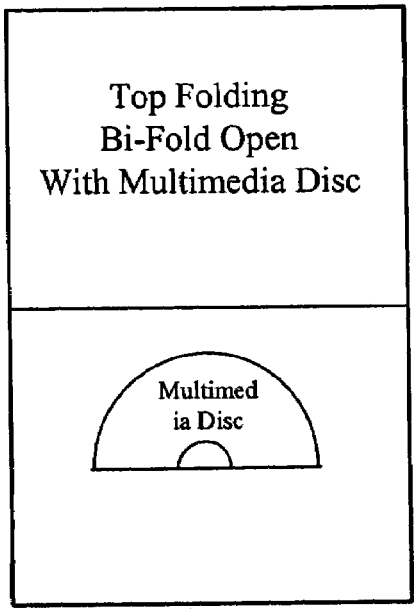
FIG. 1: Displays an example of a Top Folding Bi-Fold card design that is open with a Multimedia Disc.
Figure 1A:
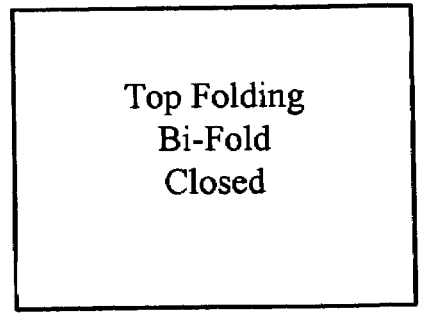
FIG. 1a: Displays an example of a Top Folding Bi-Fold card design that is closed.
Figure 2:
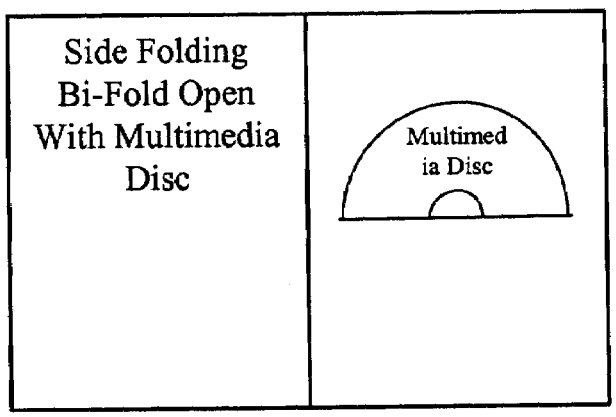
FIG. 2: Displays an example of a Side Folding Bi-Fold card that is open with a Multimedia Disc.
Figure 3:
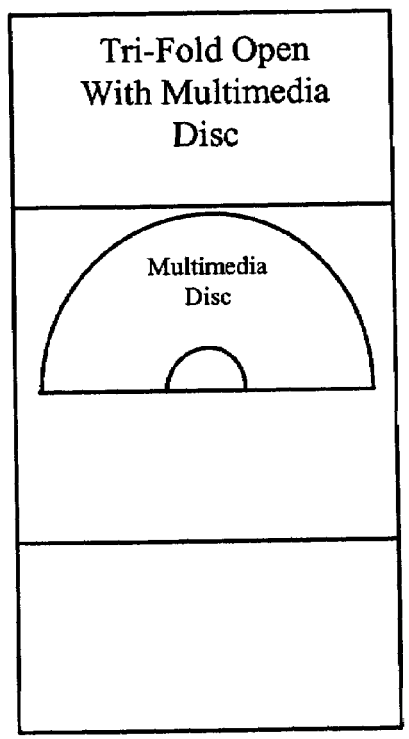
FIG. 3: Displays an example of a a Tri-Fold card design that is open with a Multimedia Disc.
Figure 2A:
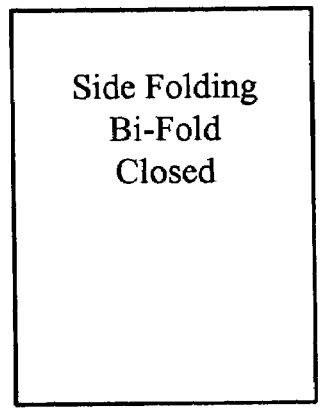
FIG. 2a: Displays an example of a Side Folding Bi-Fold card that is closed with a Multimedia Disc.
Figure 3A:
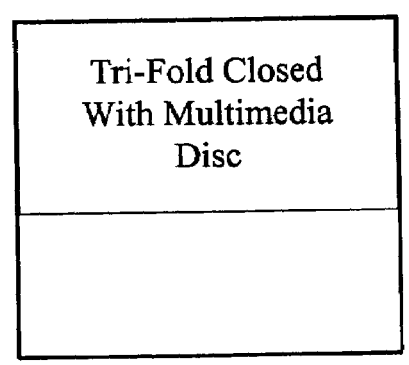
FIG. 3a: Displays an example of a Tri-Fold card design that is closed with a Multimedia Disc.
Figure 4:
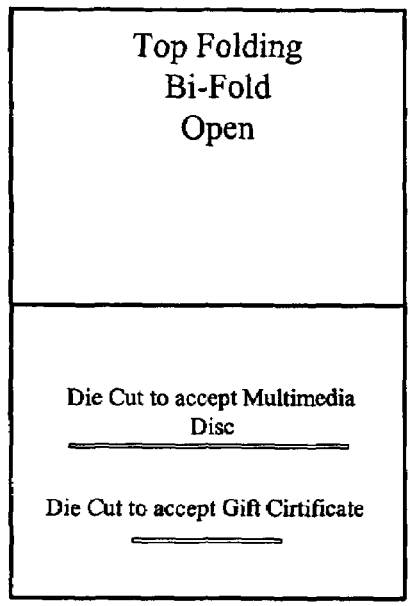
FIG. 4: Displays an example of a Top Folding Bi-Fold card design that is open showing the die-cuts that receives a Multimedia Disc and a gift certificate.
Figure 5:
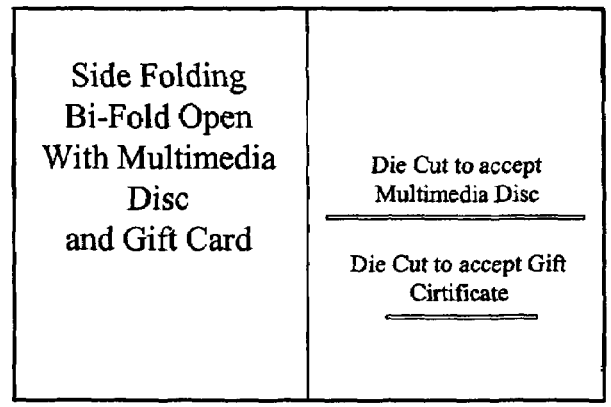
FIG. 5: Displays an example of a Side Folding Bi-Fold card design that is open showing the die-cuts that receives a Multimedia Disc and a gift certificate.
Figure 6:
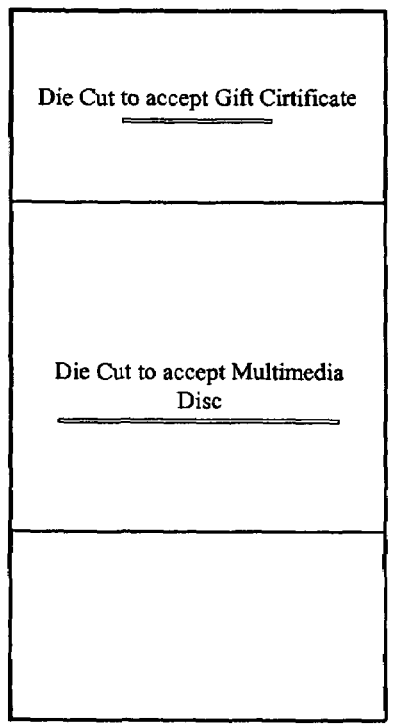
FIG. 6: Displays an example of a Tri-Fold card design showing the die-cuts that receives a Multimedia Disc and a gift certificate.
Figure 7:
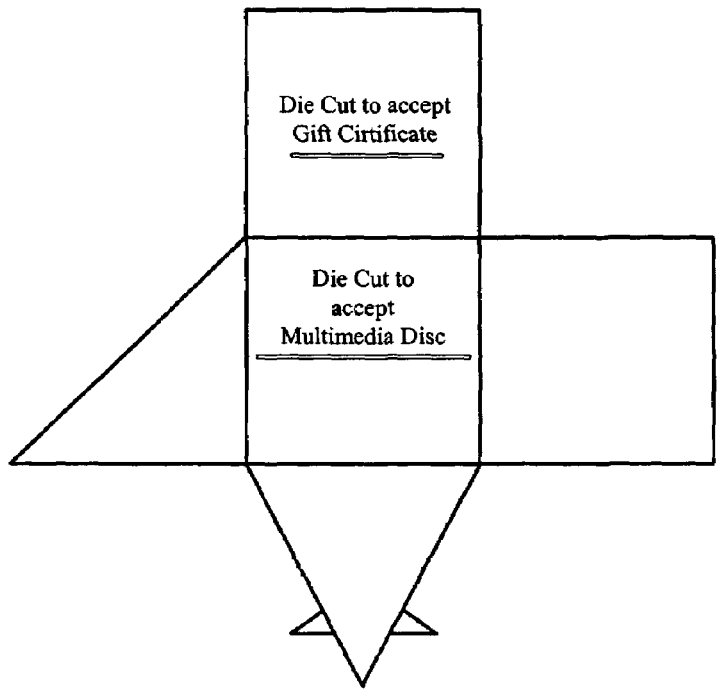
FIG. 7: Displays an example of a Multi-Fold card design showing the die-cuts that receives a Multimedia Disc and a gift certificate.
Figure 12:
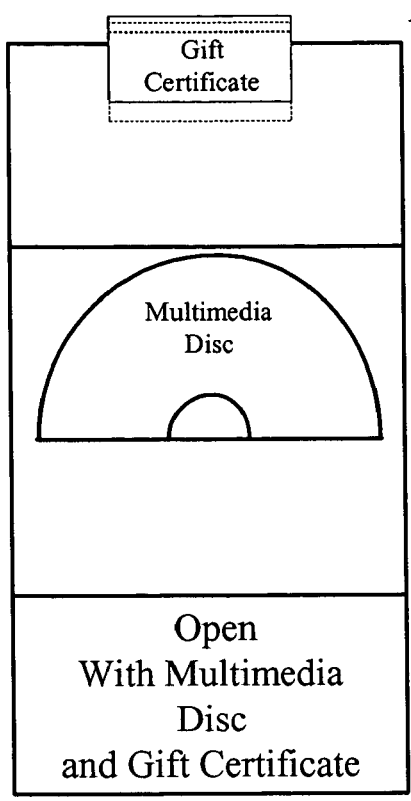
FIG. 12: Displays an example of a Tri-Fold card design that is open with a Multimedia Disc and a gift certificate. The gift certificate is positioned to allow easy access to the magnetic strip or bar code that is placed on the back of the gift card.
Figure 12A:
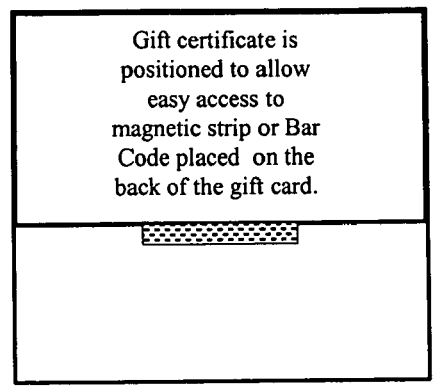
FIG. 12a: Displays an example of a Tri-Fold card design that is closed with a Multimedia Disc and a gift certificate. The gift certificate is positioned to allow easy access to the magnetic strip or bar code that is placed on the back of the gift card. This will allow easy access for retail sale.
Figure 13:
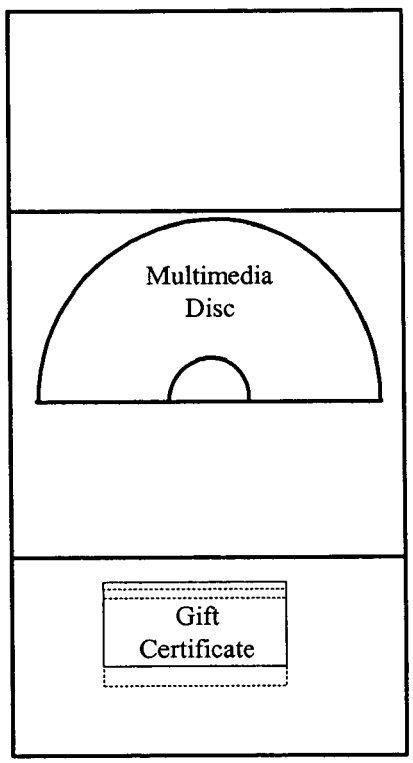
FIG. 13: Displays an example of a Tri-Fold card design that is open with a Multimedia Disc and a gift certificate. The gift certificate is concealed when the gift card is closed.
Figure 13A:
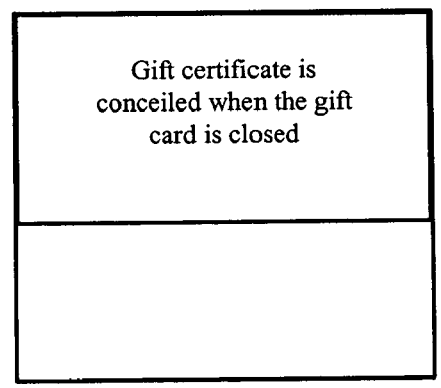
FIG. 13a: Displays an example of a Tri-Fold card design that is closed with a Multimedia Disc and a gift certificate. The gift certificate is concealed when the gift card is closed.
Figure 14:
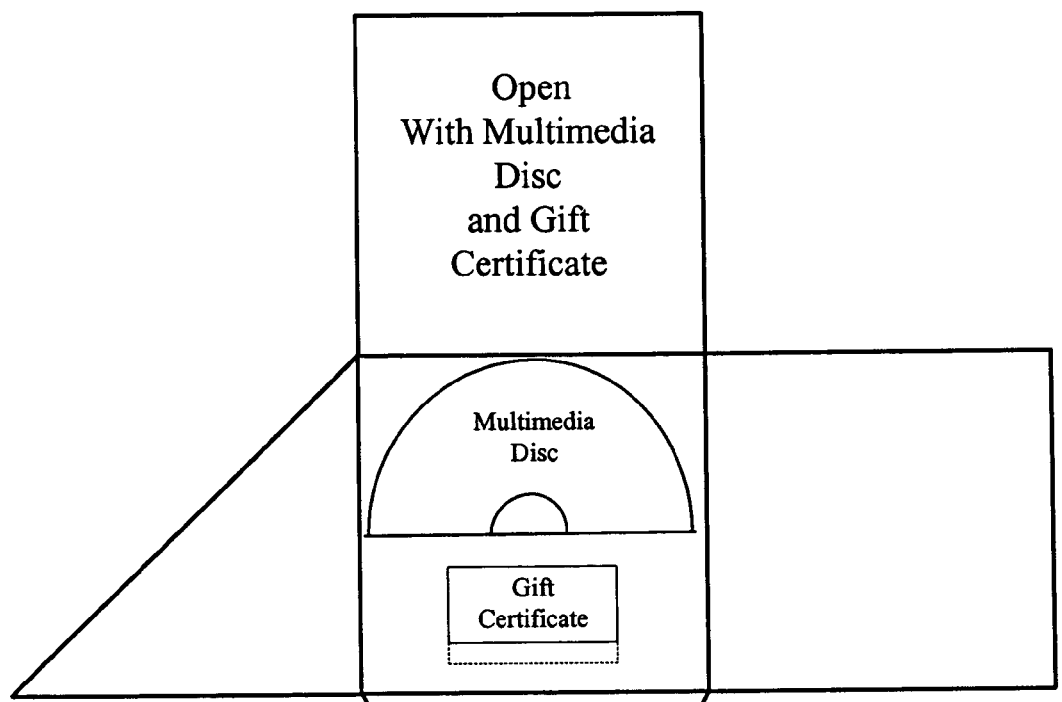
FIG. 14: Displays an example of a Multi-Fold card design that is open with a Multimedia Disc and a gift certificate.
Figure 14A:
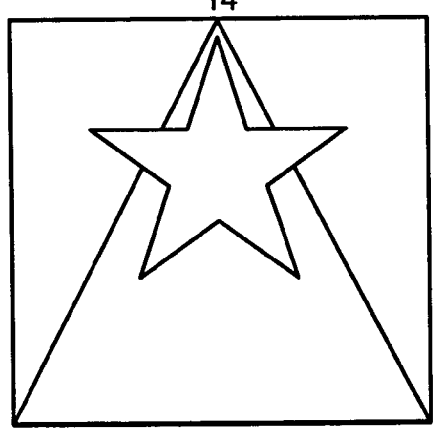
FIG. 14a: Displays an example of a Multi-Fold card design that is closed with a Multimedia Disc and a gift certificate.

For the purpose of describing this invention, the definition of provider will include, but not be limited to individual businesses, corporations, retail establishments, brokerage firms, universities, professionals and sales personnel that utilizes the Multimedia Gift Card for its intended use.

For the purpose of describing this invention, the definition of receiver is the person who receives the end product for personal use.

For the purpose of this invention, the definition of a Multimedia Disc will include, but not be limited to, any medium that can store digital data to include Compact Discs, Mini Compact Discs and DVD's.

The card exterior displays the artwork. The physical characteristics are individually designed to best support the overall card design and represent the provider. A bi-fold, tri-fold or multi-fold card of various shapes and sizes are used. Computer generated graphics are printed on heavy weight paper to medium weight cardboard. Every card is folded, die-cut and glued to receive, but not be limited to a multimedia disc, gift certificate, coupon or phone card. The gift certificate/coupon is placed in the card for easy accessibility and scanning by the retailer. The multimedia disc is placed in the card so that the label is in view. Both types of cards are available with an envelope that can be sent via mail or any other standard method of shipping.

The card displays professionally created artwork, logos, seasonal, special occasion and festive graphics that best portray the provider's intent for the overall multimedia card design. The artwork will vary for each application and can have a multitude of colors, designs and themes. All sides of the card can be used depending on the providers overall card and multimedia disc design.

The Multimedia Disc can include, but is not limited to: Seasonal and non-seasonal professionally recorded digital music, (to include, all varieties, types, and styles), multimedia presentations, video, product information, store locations, databases, printable coupons, catalogues, personal and corporate history information, web site links, university information and curriculums.

The multimedia disc label will be designed to match the artwork of the card and will include, but not be limited to, song titles, artist names, logos, and provider information. The personalized label will continually remind the receiver of the multimedia disc's origin, which will ultimately create a lasting tie to the provider.

The invention claimed is:

1. A card assembly comprising:
   a card body, having card body indicia inscribed thereon, wherein said card body comprises a generally flat outer panel having an outer panel first face and an outer panel second face, wherein said outer panel second face is substantially opposite said outer panel first face, and wherein said card body further comprises a generally flat inner panel, wherein said inner panel is attached to and coextensive with said outer panel, and said inner panel comprises an inner panel first face and an inner panel second face, wherein said inner panel second face is substantially opposite said inner panel first face, and wherein the outer panel first face is disposed in an aligned, facing relation to said inner panel first face;
   a first opening formed in said inner panel second face; and
   a machine readable storage medium received in said first opening, wherein a portion of said machine readable storage medium is retained between the inner panel first face and the outer panel first face; and
   a first thematic indicia, wherein said first thematic indicia is disposed upon said machine 2. The card assembly of claim 1, wherein said machine readable storage medium comprises stored data.

3. The card assembly of claim 2, wherein said stored data is thematically related to said card body indicia.

4. The card assembly of claim 3, wherein said card body is formed from a die cut blank.

5. The card assembly of claim 4, wherein said first opening is formed via die cutting.

6. The card assembly of claim 5, wherein said card body includes a first fold line.

7. The card assembly of claim 6, whereby folding of said card body along said first fold line conceals said machine readable storage medium.

8. The card assembly of claim 7, wherein said card body is folded along said first fold line in a top folding manner.

9. The card assembly of claim 7, wherein said card body is folded along said first fold line in a side folding manner.

10. The card assembly of claim 7, further comprising a second fold line.

11. The card assembly of claim 4, further comprising
a second opening in said inner panel second face; and
a first gift card received in said second opening.

12. The card assembly of claim 11, wherein said second opening is formed via die cutting.

13. The card assembly of claim 12, wherein said card body includes a first fold line, wherein said card body is folded about said first fold line forming a first panel and a second panel.

14. The card assembly of claim 13, wherein said first opening and said second opening are located on said first panel.

15. The card assembly of claim 13, wherein said first opening is located on said first panel and said second opening is located on said second panel.

16. The card assembly of claim 13, wherein said first opening is located on said second panel and said second opening is located on said first panel.

17. The card assembly of claim 13, whereby folding of said card body along said first fold line conceals said machine readable storage medium.

18. The card assembly of claim 17, wherein said card body is folded along said first fold line in a top folding manner.

19. The card assembly of claim 17, wherein said card body is folded along said first fold line in a side folding manner.

20. The card assembly of claim 17, further comprising a second fold line.

21. The card assembly of claim 17, further comprising a plurality of fold lines.

22. The card assembly of claim 11, wherein said first gift card includes a machine readable portion.

23. The card assembly of claim 22, wherein said machine readable portion of said first gift card from said card body so as to allow reading of the machine readable portion by a machine.

24. The card assembly of claim 23, further comprising a card attachment portion in said inner panel second face; and
a second gift card received in said card attachment portion.

25. The card assembly of claim 24, wherein said card attachment portion comprises a plurality of tabs.

26. The card assembly of claim 24, wherein said card attachment portion comprises an adhesive.

27. A card assembly comprising:
a card body, having card body indicia inscribed thereon, wherein said card body comprises a generally flat outer panel having an outer panel first face and an outer panel second face, wherein said outer panel second face is substantially opposite said outer panel first face, and wherein said card body further comprises a generally flat inner panel, wherein said inner panel is attached to and coextensive with said outer panel, and said inner panel comprises an inner panel first face and an inner panel second face, wherein said inner panel second face is substantially opposite said inner panel first face, and wherein the outer panel first face is disposed in an aligned, facing relation to said inner panel first face;

a first opening formed in said inner panel second face; and a machine readable storage medium received in said first opening, wherein a portion of said machine readable storage medium is retained between the inner panel first face and the outer panel first face, and wherein said machine readable storage medium includes a first thematic indicia, wherein said first thematic indicia is disposed upon said machine readable storage medium, and wherein said first thematic indicia is thematically related to said card body indicia;

a second opening in said inner panel second face;

a first gift card received in said second opening; and a first fold line, wherein folding of said card body along said first fold line conceals said machine readable storage medium.

28. The card assembly of claim 27, wherein said first gift card includes a machine readable portion.

29. The card assembly of claim 28, wherein said machine readable portion of said first gift card extends from said card body so as to allow reading of the machine readable portion by a machine.

30. The card assembly of claim 29, further comprising a second fold line.

31. The card assembly of claim 30, further comprising a plurality of fold lines.

* * * * *